Jan. 1, 1946. E. WILDHABER 2,392,278
CUTTER FOR PRODUCING GEARS
Filed Jan. 19, 1942 7 Sheets-Sheet 1

Inventor
ERNEST WILDHABER

By
Attorney

Jan. 1, 1946. E. WILDHABER 2,392,278
CUTTER FOR PRODUCING GEARS
Filed Jan. 19, 1942 7 Sheets-Sheet 3

Inventor
ERNEST WILDHABER
By
Attorney

Jan. 1, 1946.  E. WILDHABER  2,392,278
CUTTER FOR PRODUCING GEARS
Filed Jan. 19, 1942  7 Sheets-Sheet 4

Inventor
ERNEST WILDHABER
By
Attorney

Jan. 1, 1946. E. WILDHABER 2,392,278
CUTTER FOR PRODUCING GEARS
Filed Jan. 19, 1942 7 Sheets-Sheet 5

Inventor
ERNEST WILDHABER
By
Attorney

Jan. 1, 1946. E. WILDHABER 2,392,278
CUTTER FOR PRODUCING GEARS
Filed Jan. 19, 1942 7 Sheets-Sheet 6

Inventor
ERNEST WILDHABER
Attorney

Jan. 1, 1946.   E. WILDHABER   2,392,278
CUTTER FOR PRODUCING GEARS
Filed Jan. 19, 1942   7 Sheets-Sheet 7

Inventor
ERNEST WILDHABER
By
Attorney

Patented Jan. 1, 1946

2,392,278

UNITED STATES PATENT OFFICE 2,392,278

CUTTER FOR PRODUCING GEARS

Ernest Wildhaber, Brighton, N. Y., assignor to Gleason Works, Rochester, N. Y., a corporation of New York Application January 19, 1942, Serial No. 427,323

21 Claims. (Cl. 29—103)

The present invention relates to cutters for and to methods of producing gears and particularly to disc-type cutters which are of varying point-width around their periphery and to methods of employing such cutters in the production of straight tooth cylindrical and tapered gears.

In my pending applications, Serial Nos. 360,437 and 401,631, filed October 9, 1940, and July 9, 1941, respectively, now Patents No. 2,357,153 of August 29, 1944, and No. 2,376,465 of May 22, 1945, respectively, I have described methods of cutting bevel gears in which disc-type milling cutters are employed that have blades of varying point-width and effective contours of changing profile shape around their peripheries and in which each tooth space of a gear blank is cut by rotating the cutter in engagement with the blank while effecting a relative lengthwise feed movement between the cutter and blank back and forth across the face of the blank in time with the cutter rotation so that different blades of the cutter cut at different points along the length of a tooth space during a revolution of the cutter to produce a tooth space tapering in width from end to end as required in a bevel gear. In my pending application No. 360,437, the cutter employed is of the gap-type and has both roughing and finishing blades so that a tooth space of a gear blank may be successively roughed and finished in a pass of the cutter back and forth across the face of the blank and in a single revolution of the cutter. In the method of my application No. 401,631, the cutter makes several passes back and forth across the face of the blank in the course of cutting a tooth space, being fed relatively into depth between or during passes until full tooth depth is reached, and then being withdrawn from engagement with the blank to permit indexing the blank. This latter application preferably employs a cutter having blades all around its periphery and is especially suitable for rough-cutting operations.

The cutters used in my two applications mentioned are quite similar in structure and an aim of the present invention generally is to provide improvements that will be applicable to cutters used in both processes.

A primary object of the present invention is to provide a disc-type cutter, suitable for cutting gears according to the process of my application No. 401,631 above mentioned, which will be simple and easy to make.

A further object of the invention is to provide a disc-type cutter for roughing and finishing gears according to the process disclosed in my application No. 360,437 above mentioned which will be cheaper and easier to manufacture than the cutters heretofore employed in this process.

Another object of the invention is to provide a cutter for practicing the processes of either of the applications above mentioned which permits the use of a larger number of cutting blades and which therefore may have a faster cutting action and produce a better tooth surface finish than the cutters heretofore employed in these processes.

A further object of the invention is to incorporate the principles of the invention in the construction of a cutter which may be used for cutting spur gears, and to provide a new and very fast process for cutting such gears employing such a cutter.

Other objects of the invention will be apparent from the specification and from the recital of the appended claims.

Cutters made according to the present invention have blades of varying point width but of uniform height, and their tip-cutting edges are arranged in a circle concentric of the axis of the cutter.

For cutting bevel gears, the blades are preferably made of uniform circular arcuate profile curvature with the centers of the profiles of successive blades displaced from one another radially and axially of the cutter axis in conformity to the principles of my applications above mentioned.

For cutting the tooth space of a gear according to the process of my prior application No. 401,631 above mentioned, the cutting portions of the blades of the cutter can be made either of the full height of the tooth spaces to be cut or of considerably less than full height. The latter construction permits of providing a greater number of blades in a cutter head than can be provided where the blades are of full height, for the smaller gashes occupy less space and the shorter height blades are less liable to breakage.

Spur gears can be cut with a cutter made according to this invention by a novel method in which the cutter has no lengthwise feed but is simply rotated in engagement with the blank while being fed depthwise into the blank in time with the cutter rotation so that different blades cut at different depths and a tooth space of the blank is roughed out in one revolution of the cutter. The cutter used has blades of progressively decreasing point-width, and the rotation of the cutter is so timed to the depthwise feed that the blades, which are of greatest point-width, cut at least depth, while those which are of least point width, cut at full depth.

The blades of the cutter can all be made with straight sides perpendicular to the axis of the cutter, that is, of zero pressure angle, or with sides that are curved. In either instance, the blades may be made of less height than the height of the tooth spaces to be cut so as to obtain in addition to a maximum number of cutting edges and longer life, tooth shapes as closely as possible approximating the finished tooth shapes desired.

Blades of cutters constructed according to the present invention may be made up in several stock sizes in advance and ground to the precise desired curvature when required. Thus manufacturing costs may be reduced to a minimum.

Several different embodiments of the invention are illustrated in the accompanying drawings, in which.

Figure 4:
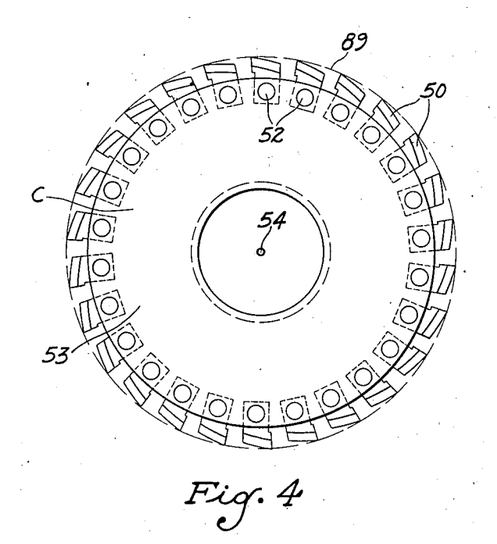
Fig. 4 is a plan view and Fig. 5 a diametric sectional view of a cutter constructed according to one embodiment of this invention and suitable for use in the process of my prior application No. 401,631.
Figure 5:
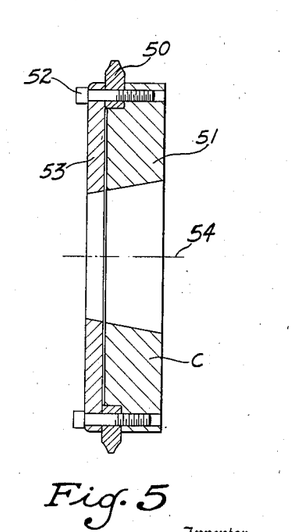

Cutters made according to any of the embodiments of this invention are intended to be used in a process in which the cutter is rotated in engagement with the gear blank while simultaneously a relative feed movement is produced between the cutter and blank in time with the cutter rotation. The feed movement may be a movement lengthwise of a tooth space of the gear blank, or a movement depthwise, or it may be a combination of both lengthwise and depthwise movements. Figs. 4 and 5 show a cutter made according to this invention for cutting gears according to the process of my prior application No. 401,631 above mentioned where both lengthwise and depthwise feed movements are produced in time with the cutter rotation.

The cutter C of Figs. 4 and 5 has a plurality of radially-arranged inserted blades 50 which are secured in slots provided around the periphery of the rotary cutter head 51. The blades are secured to the cutter head by screws 52 and a clamping disc 53. The blades 50 are relieved both on their tips and sides back of their front faces to have tip and side-cutting edges. The side-cutting edges of the blades are of curved profile, preferably being concave circular arcs. The profile curvature of corresponding side-cutting edges of the blades is preferably uniform, but the centers of curvature of the corresponding side-edges of successive blades are preferably displaced from one another, as will be described hereinafter in more detail. The blades also have progressively varying point width, as will be described in further detail hereafter.

In the instance illustrated, the blades are double-edged, being sharpened so that each blade has two side-cutting edges, respectively, at opposite sides of the blades. It will be understood, though, that the blades might be sharpened instead to have side-cutting edges for cutting on one side only of a tooth space, and alternate blades might then be sharpened to have opposite side-cutting edges.

Figure 1:
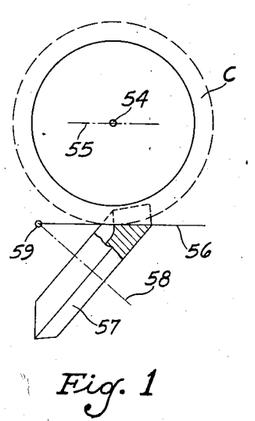
Figs. 1 to 3 inclusive are diagrammatic views, showing successive longitudinal positions of a cutter, when in full depth engagement with a gear blank, in the process of cutting gears according to the method of my prior application No. 401,631.
Figure 2:
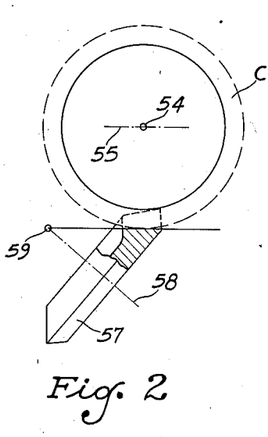
Figure 3:
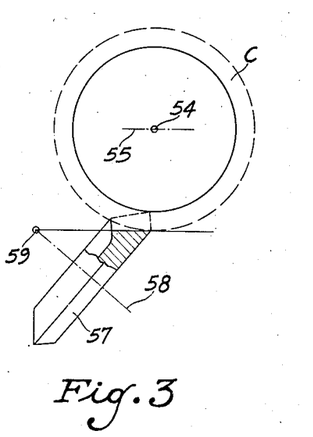

Figs. 1 to 3 inclusive illustrate diagrammatically the method of my application No. 401,631, showing different successive longitudinal positions of the cutter C after it has been fed into full depth position. 57 denotes the gear to be cut, 58 its axis, and 59 its apex. As the cutter rotates on its axis 54, it is simultaneously fed lengthwise of the tooth space being cut in time with its rotation, the axis 54 moving along a line 55 which is parallel to the root line 56 of the tooth space being cut. Fig. 1 shows the position of the cutter when it is cutting at the small end of the tooth space of the bevel gear 57. Fig. 2 shows the position of the cutter after it has rotated angularly and has been fed longitudinally from the position shown in Fig. 1 and is cutting at the center of the tooth space of the gear, while Fig. 3 shows the position of the cutter when it has rotated through a still further angle and has been fed further along the length of the tooth space and is cutting at the large end of the tooth space.

In the process of my application No. 401,631, the lengthwise movement of the cutter is preferably produced by mounting the cutter eccentrically on the tool spindle of the machine and rotating the tool spindle while constraining its motion so that the center of the cutter will move, as desired, parallel to the root line of the tooth space being cut. Because of the eccentric mounting of the cutter, the lengthwise movement is a harmonic motion. Moreover, it repeats with each cutter revolution. The depthwise feed movement takes place during a plurality of revolutions of the cutter and may be controlled by a suitable feed cam. After a tooth space of the blank has been cut, the cutter is withdrawn from engagement with the blank, the blank is indexed, and the cycle begins anew.

Figure 7:
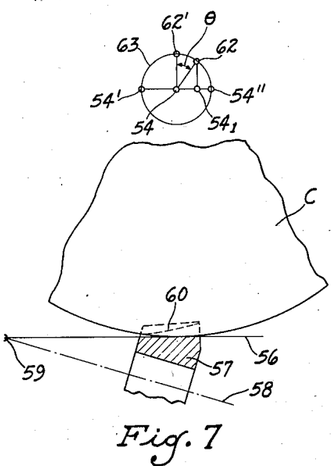
Fig. 7 is a diagrammatic view, illustrating the relationship between the cutter and the blank when the cutter is at the middle of its stroke in full depth position.

Fig. 7 shows a cutter operating according to the process of my application No. 401,631 in the middle of its lengthwise feed stroke and at full depth position. The cutting surface of the cutter, that is, the surface which contains all of its cuttings edges, contacts with the tooth surface produced on the gear blank 57 along a line 60 which extends somewhat diagonally across the tooth side.

As already stated, in the movement of the cutter at full depth, the cutter center 54 travels in the direction of the root line 56 of the gear blank 57. The cutter center then travels between the end positions 54' and 54". Because of the harmonic motion of the cutter, due to its eccentric mounting, the velocity of lengthwise movement of the cutter is at a maximum at the center of the stroke and zero at its ends where reversal occurs. In any intermediate position $54_1$, the ordinate $54_1$—62 is a measure of the instantaneous velocity of the cutter center in its stroke. The point 62 is located on a circle 63 drawn about the center 54 of the cutter through the points 54' and 54". The angle $\theta$, which is equal to 62'—54—62 is the turning angle of the cutter as the cutter center moves from the position 54 to the position $54_1$. It will be seen that the distance traveled to the right of the point 54 is proportional to $\sin \theta$ and that the instantaneous velocity is proportional to $\cos \theta$.

In setting out to make a bevel gear cutter for practicing the process of my application No. 401,631, the first task before us is to determine the cutting surface required to cut a given bevel gear. As will be seen from Figs. 9 and 10, the tangents 65 and 65' to opposite sides 66 and 66' of a tooth space of the bevel gear 57 at mean points 67 and 67' are seen to intersect in a point 68. The tangential planes to the tooth sides at the points 67 and 67' contain the said tangents 65 and 65' and also pass through the apex 59 of the bevel gear. They intersect, therefore, in a straight line 69 which connects the apex 59 with the point 68 and which is perpendicular to the drawing plane of Fig. 10. These tangential planes contact, moreover, with the tooth surfaces of the bevel gear along a straight line 70, radiating from the apex 59 and passing through the mean points 67 and 67'.

Let us now analyze the location of the points of the cutting surface which are conjugate to the straight line of tangency 70. They are points which during rotation and lengthwise feed of the cutter will describe said straight line.

I have found that the cutter surface conjugate to a tangential plane 67—59—68 is a conical surface centered at 75 (Fig. 9) and having an axis parallel to and offset from the center 54 of the cutter. This conical surface describes the entire tangential plane 67—59—68, within the length of a tooth side, during the relative rotational and lengthwise feed movement of the cutter and, therefore, also contains the sought curve.

Figure 9:
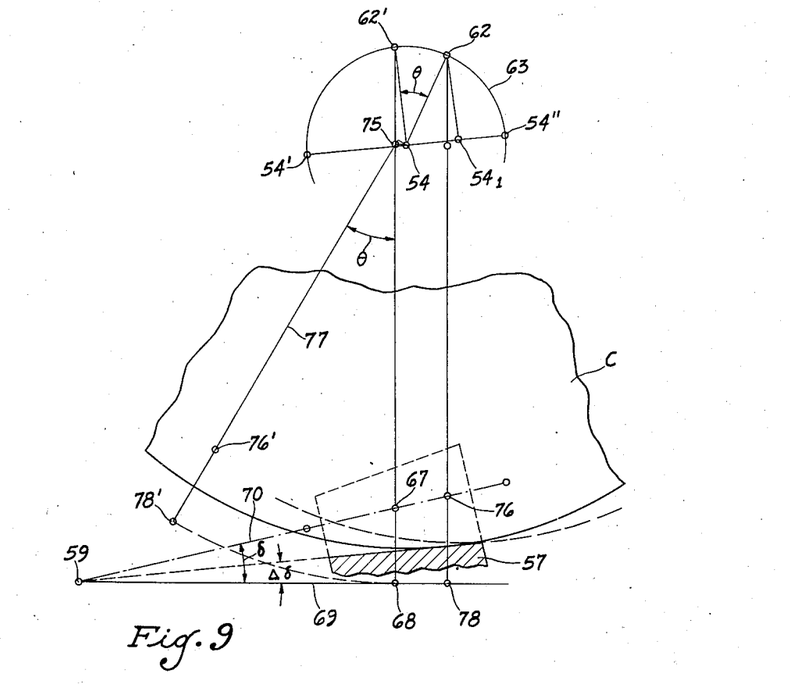
Fig. 9 is a further diagrammatic view, showing in greater detail the kinematic relationships existing between the cutter and the blank, and further illustrating how the profile shapes of the side-cutting edges of the blades of the cutter may be determined.
Figure 10:
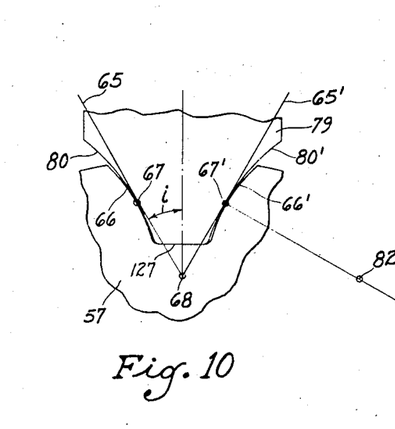
Fig. 10 is a section through cutter and blank taken through a mean point longitudinally of the tooth space of the blank at right angles to line 69.

In the position shown in Fig. 9, and in any other position, a tangential plane contacts with its conjugate conical surface in a straight line which is the projection of the instantaneous axis of relative motion to said plane. In Fig. 9, this straight line passes through the instantaneous axis 62' and mean point 67 and coincides with the tangent 65 (Fig. 10). When the cutter center is at $54_1$, the instantaneous axis is at 62 and the line of contact with the tangential plane appears as a line 62—76.

The plane containing the said line of contact and the instantaneous axis is offset from the cutter axis 54 a distance $(54_1-62) \sin \Delta \delta$, and in the central position the distance, which is hereinafter denoted at $k$, is equal to distance $(54-62') \sin \Delta \delta$. $\Delta \delta$ denotes the angle between the direction of feed and line 69.

With the distance (54—62′) equal to E, we have:

$$k = E \sin \Delta\delta$$

The offset of the plane 62—76 from the center 54₁ of the cutter is therefore equal to $$E \cos \theta \cdot \sin \Delta\delta = k \cos \theta$$

If we now turn the cutter back through the angle $\theta$, its center will again coincide with 54, and the offset plane 62—76 will appear as a line 77 inclined at angle $\theta$ to the plane 62′—67. This plane must pass through the point 75, which is the projection of the center 54 to the plane 62′—67, for it intersects line 54—75 at a distance from 54 equal to its offset $k \cos \theta$ from the cutter axis divided by $\cos \theta$. Its distance is therefore equal to $k$, which is equal to 54—75.

Point 78 is the intersection of the line of contact of the plane 62—76 with the central plane and appears as point 78′ after reverse rotation through the angle $\theta$. Its distance from point 75 is equal to the distance from point 78 to the projection of point 54₁ minus $k \sin \theta$ or:

distance (75—68) + (distance 54—54₁)·$\sin \Delta\delta - k \sin \theta$

Now:

distance (54—54₁) $\sin \Delta\delta$ = distance (54—62′) $\sin \theta$ $\sin \Delta\delta$
$= E \sin \theta \sin \Delta\delta$
$= k \sin \theta$ Hence:

distance (75—78′) = distance (75—68)

This demonstrates that the straight line elements pass through the point 75 and intersect the central plane at a constant distance from the point 75, that is, that they lie in a circle centered at 75. The straight line elements constitute, therefore, a conical surface whose axis passes through 75 and is parallel to the cutter axis 54, for the inclination of the straight line elements to the central plane is a constant angle $i$, see Fig. 10.

Let us now consider point 76′ of line 77 which corresponds to point 76 of line 70 and coincides with point 76 before the described backward rotation of the cutter. Distance 78′—76′ equals distance 78—76 which equals distance (68—67) + distance (68—78) tan $\delta$, where $\delta$ denotes the angle 67—59—68 (Fig. 9).

It is seen from Fig. 9 that:

distance (68—78) = $E[\sin (\theta - \Delta\delta) + \sin \Delta\delta]$ where E is equal to 54—62′. It is further seen that the distance of the point 76′ from the point 78′ is equal to:

distance (68—67) + $E \sin \Delta\delta \cdot \tan \delta + E \sin (\theta - \Delta\delta) \tan \delta$ of which only the last member is a variable.

The various points 76′, which correspond to different turning angles $\theta$, constitute the curve conjugate to the straight line 59—67 of the tooth surface. This curve can be described by a point, which moves along a straight line element of the conical surface centered at 75, while said element rotates on the cone axis 75. Point 76′ reaches the shortest distance from the cone apex when $\theta$ is equal to $(90° + \Delta\delta)$ and sin $(\theta - \Delta\delta)$ is equal to 1. It reaches the longest distance when $\theta$ is equal to $(-90° + \Delta\delta)$ and it attains a mean distance when $\theta$ is equal to $\Delta\delta$.

The next step is to determine the profiles 80 and 80′ of the cutter, which are preferably made circular arcs. Each of these profiles, as, for instance, the cutting profile 80′ has a larger radius 67′—81 (Fig. 10) than the curvature radius 67′—82 of the corresponding tooth profile 66′ on account of the diagonal position of the line of contact 60 (Fig. 7) between the gear and the cutting surface of the cutter.

Figure 8:
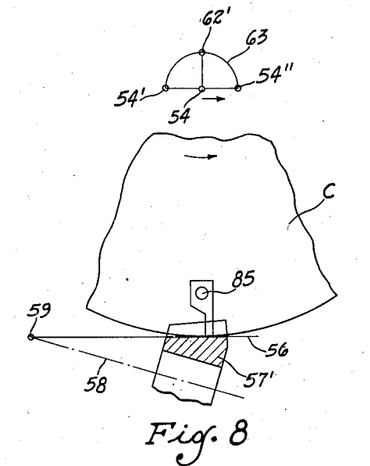
Fig. 8 is a diagrammatic view, showing one way in which the profile shapes of the side-cutting edges of the blades of this cutter may be determined.

The radius of the cutting profile 80′ can readily be computed or it may also be determined experimentally as shown in Fig. 8. A blade 79, which is intended to cut at the middle of the face of the gear, may be replaced by a dummy blade of comparatively soft material, which is mounted in the same place as the actual blade. The same relative motions viz. rotation and lengthwise feed, are then effected between the piece 85 and a finished hardened gear 57′, as take place between the cutter blade and the gear blank during the cutting of a tooth space of the blank. In this way a cutting edge of the desired profile curvature will be formed on the piece 85. The highest accuracy can be obtained by going through the process several times after restoring the front face of the piece 85 by grinding or otherwise so that as little deformation as possible will take place in the final step.

After having determined the mean profile of the cutting surface, that is, the mean cutting edge, which passes through the point 67, the cutting surface itself can be described by moving this profile along the tangent 65 or 65′ (Fig. 10), as the case may be, while turning the cutter on the axis 75 of the above determined conical surface.

Instead of turning the cutter on the axis 75, it may also be turned on its own center 54 by moving this center in a circle about the axis 75. This motion moves the cutter center 54 toward and away from the intersection line 68—59 of the mean tangential plane, and also lengthwise of this line. This lengthwise motion is found to be negligible in its effect.

The in-and-out motion can be conveniently effected by an eccentric 83 (Fig. 13) mounted on the cutter axis having a center 75 offset a distance $k$ from the cutter axis 54. The eccentric engages a plane surfaced abutment 84 whose plane engaging surface is parallel to the line 59—68.

Figure 13:
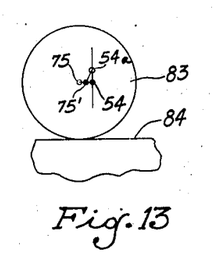
Fig. 13 is a diagrammatic view illustrating one way of producing the radial feed motion of the cutter in manufacture of the cutter.

The side cutting surface for one side of the cutter can therefore be described by moving the cutting profile 80′ (Fig. 10), for instance, along the tangent 65′ as the cutter turns on its center and as its center moves in and out along a straight line parallel to the line 75—68 (Fig. 9), and appearing as the line 54—54ₐ in Fig. 13. This in-and-out motion is a harmonic motion, defined by an ordinate equal to $k \sin \theta$. The motion along the tangent 65′ is also a harmonic motion which in a projection (Fig. 9) has been determined as $E \tan \delta [\sin (\theta - \Delta\delta) + \sin \Delta\delta]$ which is in actuality:

$$T = \frac{E \tan \delta}{\cos i} [\sin (\theta - \Delta\delta) + \sin \Delta\delta]$$

Figure 11:
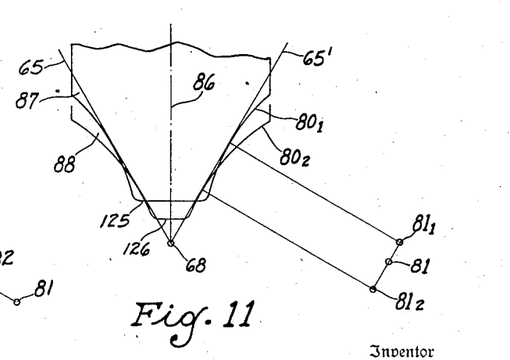
Fig. 11 is a diagrammatic view illustrating the positions occupied by different blades of the cutter during the cutting of a tooth of the blank.

The end positions of the cutting profiles, at the time of their cut, are shown in Fig. 11. 87 is a blade which cuts at one end of the tooth space and 88 is a blade which cuts at the other end of the tooth space. These blades have side profiles formed by displacing the cutting profiles 80 and 80′ along the tangents 65 and 65′, respectively. Thus, the centers 81₁ and 81₂, respectively, of the profiles 80₁ and 80₂ of the same sides of blades 87 and 88 are displaced parallel to said tangent 65′ from the center 81 of the corresponding side profile 80′ of the mean blade 79. The amount of this radial and axial displacement is determined as above set forth by the tooth shapes required on the gear to be cut.

Figure 12:
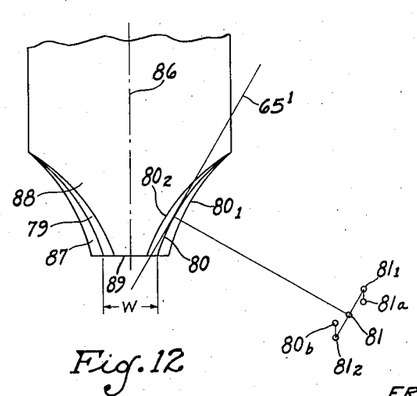
Fig. 12 is a diagrammatic view, showing the different blades superimposed on one another in a radial plane of the cutter.

Cutters of the type described have a cylindrical outside cutting surface 89 (Fig. 12) which is of varying point-width. The point-width is at its maximum and its minimum at diametrically opposite points around the periphery of the cutter, and the inclination of the cutting profile to a plane of rotation 86 of the cutter increases with decreasing point width. Thus, as shown in Fig. 12, the cutting profile $80_1$ of the blade 87, whose tip cutting edge 125 is of greatest point-width, has the least inclination to said plane of rotation, while the side-cutting edge $80_2$ of the blade 88 whose tip-cutting edge 126 is of least point-width, has the greatest inclination to said plane. The point-width of the tip cutting edge 127 of the mean blade 79, which cuts at the center of the face, is between the maximum and minimum point-widths, and the inclination of the side-cutting edge 80 of this blade is between the maximum and minimum inclinations of the corresponding side-cutting edges of the blades 87 and 88.

It will be noted that the side edges $80_2$, 80 and $80_1$ form obtuse angles with the tip-cutting edges of these blades. It will be noted, too, that the point-width of the blade 87 in the instance shown is more than twice the point-width of the blade 89. Ordinarily the largest point-width of the blades is at least fifty per cent larger than the smallest point width.

Figure 6:
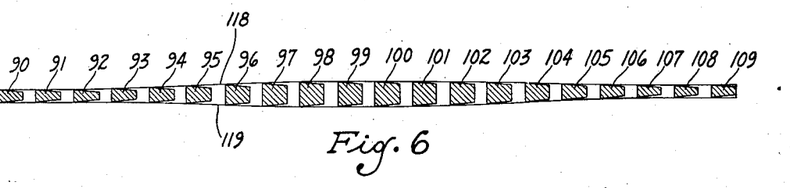
Fig. 6 is a developed sectional view of this cutter.

Fig. 6 shows a cutter made according to the described embodiment of the invention in section in development. The different blades of the cutter, which have been heretofore designated generally at 59, are here denoted by the reference numerals 90 to 109 inclusive. It will be noted that the blades 90 and 109 which are of smallest point-width are diametrically opposite the blades 100 and 99 which are of greatest point-width. As will be seen from Fig. 6, all of the blades have their side surfaces relieved with reference to the surfaces 118 and 119 which contain, respectively, the side-cutting edges of all the blades of the cutter, that is, which constitute the opposite side-cutting surfaces of the cutter. It will be noted that the side surface 118 and 119 are not true helical surfaces but are slightly concave between their points of maximum and minimum width. This is because of the harmonic nature of the cutting motion employed in cutting gears with this cutter and because of making the cutter to conform to said motion.

Fig. 12 illustrates the positions of the profiles of the blades 88, 79, and 87 of the cutter when superimposed upon one another, that is, when rotated into the same radial plane of the cutter. Since the tip-cutting edges of the blades are at a constant radial distance from the axis of the cutter, a radial displacement $81_1$—$81_a$ must be added geometrically to a displacement 81—$81_1$ for the center of the blade profile $80_1$ along the tangent 65' in order to locate the positions of the blades in the cutter itself. This added radial displacement $81_1$—$81_a$ is equal and opposite to the depthwise movement with respect to line 69 performed by the cutter center during the feed of the cutter from one end of the blank to the other. In this way, the true center $81_a$ of the profile $80_1$ for the position shown in Fig. 12 can be arrived at. In similar manner, the position $80_b$ of the center of the profile $80_2$ can be determined.

The shape of the cutting edge itself may be determined by intersecting the cutting surface with the cutting face of a blade which is usually a plane face, or it can be ascertained by the experimental method described with reference to Fig. 8.

When the shape of the cutting edges and their distribution about the axis of the cutter have been determined, there is sufficient information available for making and relieving the cutter on a relieving machine such as described in my U. S. Patent No. 2,221,827 of November 19, 1940.

Figures 14, 15:
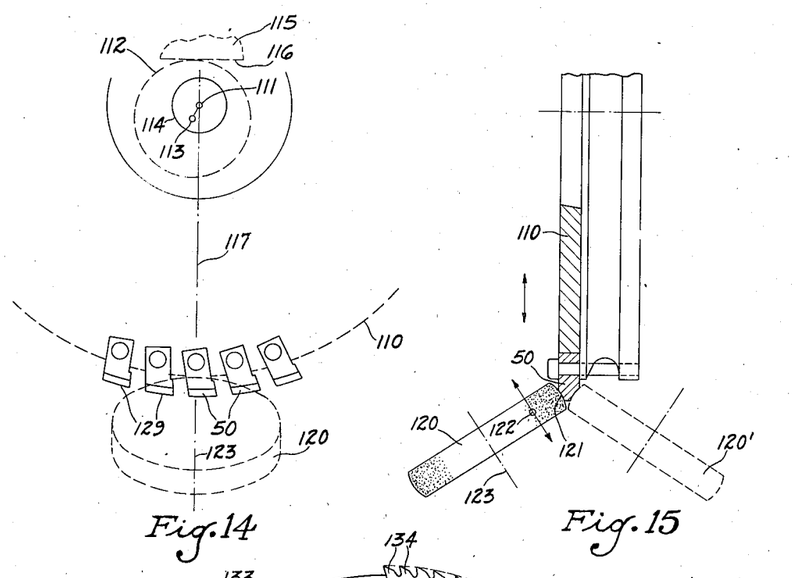
Figs. 14 and 15 are diagrammatic plan and sectional views, respectively, showing one way of relieving the side surfaces of blades of the cutter shown in Figs. 4 and 5.

One way, in which the side surfaces of the blades of the cutter described may be relief-ground, is illustrated in Figs. 14 and 15. The blades 50 are here mounted in a dummy head 110 in positions tipped forward out of their true cutting positions so that the top surfaces 129 of the blades are concentric to the center 111 of the dummy head. An eccentric 112, whose center is at 113, is secured to the spindle 114 on which the dummy head is mounted. This eccentric is arranged to engage a stationary abutment 115 having a plane operative surface 116. When the dummy head 110 is rotated, then, it will be caused to move back and forth radially along the line 117 at a rate of once per revolution.

For relief-grinding the side surfaces of the blades, a grinding wheel 120 may be employed which is dressed to a circular profile 121 having a center at 122. During the rotation of the dummy head, this grinding wheel is moved by an eccentric or cam along its axis 123 in a direction tangential to the profile 121. This motion is so arranged as to repeat once per revolution of the head. The opposite side surfaces of the blades may be similarly relieved with a wheel 120'. The tops of the blades are ground concentric with the axis 111 of the head, that is, while the axis 111 stays stationary.

In the relieving machine of my U. S. Patent No. 2,221,827 before mentioned, all of the elements for relief-grinding the described type of cutter are present. All that is required to do is simply to replace the cam 38 of this patent by an eccentric, and to hold the shaft 81 and cam 80 stationary. The cams 155 and 215 move the grinding wheels axially in one cycle per revolution of the dummy head 110.

The cutter described above is primarily a roughing cutter for closely approximating a given tooth shape. Finishing cutters, which are to be used in a process employing a harmonic feed motion in the direction of the root line, can be made with side-cutting edges of uniform circular arcuate profile shape as already described. For finishing, however, the tooth design is preferably adapted to the cutting process so that the tooth surface contacts the tangential plane of the cutter at mean point 67 in a slightly concave curve facing the bottom tooth surface. In other words, the principles laid down in my earlier application No. 360,437 are preferably used in determining the tooth shapes of the gears. In such case, displacement of the cutting profile 80' (Fig. 10) along the tangent 65' is not a pure harmonic motion. It is modified to give the desired curved line of contact between the tooth surface and the tangential plane of the cutter surface. The radial displacement, however, remains unchanged.

Figure 16:
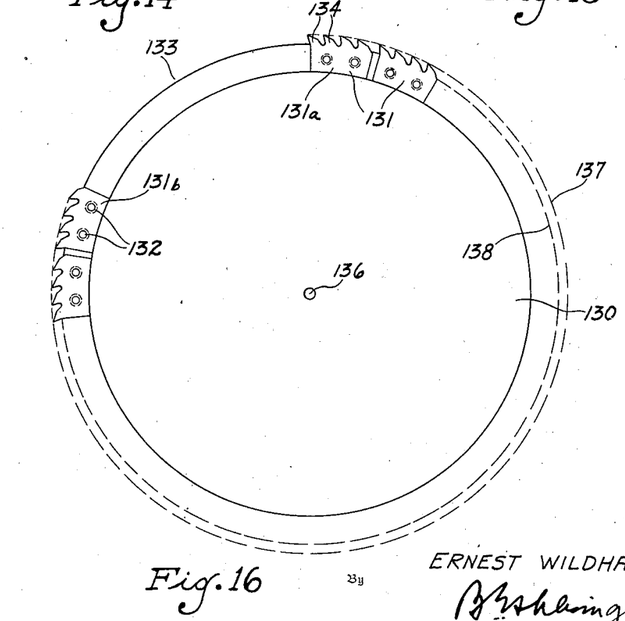
Fig. 16 is a plan view of a different embodiment of a cutter made according to the present invention.

In Fig. 16, I have shown a modified form of disc milling cutter constructed according to this invention. This cutter is of segmental form and of the gap type. It comprises a rotary head 130 and a plurality of cutting segments 131 which are secured to the head by bolts or screws 132.

In the embodiment shown, the segments are not arranged all the way around the periphery of the head but there is a peripheral gap, denoted at 133, between the first segment 131a and the last segment 131b.

In the embodiment shown, each of the segments comprises four cutting teeth or blades 134. The blades are of successively changing point-width but of uniform height and have their tip-cutting edges lying in a cylindrical surface 137 coaxial of the cutter axis 136. The roots of the grooves or notches between the successive teeth of the cutter will then lie in a cylindrical surface 138 also coaxial of the cutter axis 136. Each of the teeth or blades 134 has a hooked front face and is relieved on its tip surface back of its front face with reference to the cylindrical surface 137 to provide a tip-cutting edge.

Figure 19:
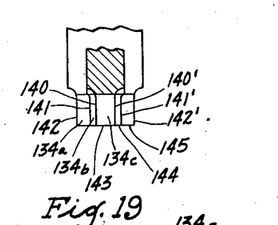
Fig. 19 is a fragmentary diagrammatic view, showing several blades of this cutter superimposed on one another in a radial plane of the cutter.

The sides of the blades may be straight or curved. When made straight, they are preferably made of zero pressure angle, that is, parallel to one another and parallel to a plane of rotation perpendicular to the axis 136 of the cutter. This construction is illustrated in Fig. 19 where three different blades or cutting teeth of the cutter are shown superimposed on one another and are denoted at 134a, 134b, and 134c, respectively. Opposite side edges of the blade 134a are denoted at 142 and 142', respectively. Opposite side edges of the blade 134b are denoted at 141 and 141', respectively. Opposite side edges of the blade 134c are denoted at 140 and 140', respectively. The tip-cutting edges of these blades are denoted at 145, 144, and 143, respectively. It will be noted that opposite side edges of the blades are of zero pressure angle, and that the tip-cutting edges are perpendicular to the side edges and parallel to the axis 136 of the cutter.

The blades are so arranged around the periphery of the cutter that the blade 134a, which is of largest point-width, is first and is followed by blades of progressively decreasing point-width. In this form of the invention, the blades are so constructed that not only do corresponding side-cutting edges of the blades lie in the same surface but also so that corresponding side surfaces of the blades lie in the same surface. Thus opposite side surfaces of the blades 134 lie in two continuous helical surfaces 147 and 148, respectively, of varying lead. This makes it possible to produce corresponding sides of the blades easily and accurately with a continuous cam-controlled motion. Nevertheless the desired relief on the sides and back of each side-cutting edge will be obtained.

Figures 17, 18:
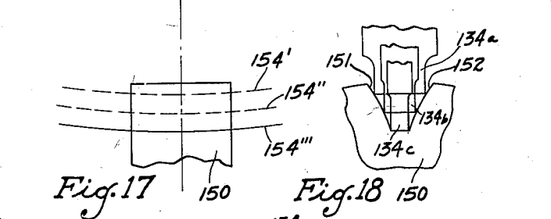
Fig. 17 is a fragmentary diagrammatic view, looking at the side of a tooth space
Fig. 18 is a fragmentary diagrammatic view, looking at the end of a tooth space, and showing how the cutter of Fig. 16 may be employed in the cutting of a spur gear according to the present invention.

The cutter described can be employed to rough-cut spur gears by a process novel with this invention. In this process, the cutter is rotated on its axis in engagement with the spur gear blank to be cut and simultaneously the cutter is fed depthwise into the blank in time with its rotation. This process is illustrated in Figs. 17 and 18. Here 150 denotes the spur gear to be cut, and 151 and 152 are opposite sides of a tooth space of this gear. The cut is started with the widest cutting blade 134a cutting first, with the axis of the cutter in position 136'. This blade sweeps across the face of the gear blank 150 from one end of a tooth space of the blank to the other and its tip edge 143 travels in a path such as denoted at 154'. As successive blades rotate into cutting position, the cutter is fed continuously depthwise into the tooth space to be cut. Thus when the blade 134b has rotated into cutting position, the cutter will have been fed depthwise so that its axis is at 136'' and as this blade sweeps across the face of the gear blank, its tip-cutting edge 144 will move in a path 154''. Finally when the cutter has been fed into full-depth position, the blade 134c will take its cut with the axis of the cutter at 136''', and the tip edge of this blade 134c will travel in a path 154'''. Because the successive blades of the cutter are of progressively narrowing point-width, roughed tooth profiles can be cut which will approach involute tooth shapes. The roughed tooth profiles will, of course, be serrated because the sides of the blades are straight and of zero pressure angle. The points of intersection of the side and tip-cutting edges of the blades will lie, however, in involute curves of the desired shape, and the greater the number of cutting edges, the more closely the roughed tooth surface will approach a smooth involute surface. Any desired tooth shape can be rough-cut by suitable selection of the point-widths of successive cutting blades.

In the process described in connection with Figs. 16 to 20 inclusive it will be seen that the cutter takes a cut which is different from the cut taken by conventional milling cutters in the conventional process of cutting a spur gear. Each blade of a cutter operating in the novel process described cuts for the full length of the tooth space at all points in the depthwise feed. Moreover, the blades cut primarily with the tip-cutting edges and cut straight-profiled chips. The chips are as long as the tooth space and have equal thickness all along their length. This is a most efficient cutting process.

After a tooth space has been cut in the gear blank, the cutter may be withdrawn rapidly from depth. The gap 133 is preferably provided between the first and last blades so that indexing may start during the withdrawal motion without waiting until the cutter has been fully withdrawn from the work. A tooth space of the blank may be completed, then, on each revolution of the cutter and the blank indexed when the gap in the cutter is abreast of the blank.

The blades of the cutter can be relieved in their own head and no special relieving motion is required. The side surfaces of the blades can be milled or ground as continuous surfaces as already described. The relieved portions back of the tip-cutting edges may be cut with a milling cutter simultaneously with the cutting of the gashes between successive blades and the relieved portions of the tip surfaces of the blades can be ground with a formed wheel of circular profile or with a flat wheel. Cutters of this kind can be made very accurately at small cost. Moreover, due to the uniform height of the blades, the cutter can be readily sharpened.

One feature of the cutter disclosed in Figs. 16 to 20 inclusive is that the cutting blades can be made to a height considerably less than the height of the tooth space to be cut, that is, the gashes between successive blades may be considerably less in depth than the depth of the tooth space to be cut. This arrangement permits of providing a maximum number of cutting edges in the cutter.

Figure 21:
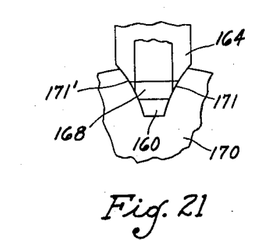
Fig. 21 is a diagrammatic view looking at the end of a tooth space of a spur gear and showing how a modified form of cutter made according to this invention may be used to cut this gear.
Figure 22:
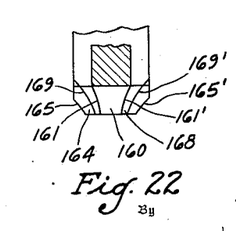
Fig. 22 is a diagrammatic view, showing several of the blades of this last form of cutter superimposed on one another in a radial plane of the cutter.

Another form of cutter for cutting spur gears by rotating the cutter in time with the depthwise feed movement is shown in Figs. 21 and 22. Fig. 22 shows the construction of the blades of this modified cutter and Fig. 21 illustrates how it operates in cutting a tooth space.

In this cutter, the blades are of curved profile, having preferably side surfaces which are of circular arcuate profile shape. In this cutter, as in the previously described embodiments of the invention, the tip-cutting edges of the blades are at a uniform radial distance from the axis of the cutter and vary in point-width around the periphery of the cutter. The blade 160, which has the smallest point width, has sides 161 and 161' which are of least inclination to a plane of rotation perpendicular to the axis 162 of the cutter, while the blade 164, which is of greatest point-width, has sides 165 and 165' of greatest inclination to the plane of rotation. The blade 168, which is arranged around the periphery of the cutter intermediate the blades 160 and 164, has sides 169 and 169' which are inclined to the plane of rotation at angles intermediate the angles of inclination of the sides of the blades 160 and 164, respectively. In other words, the inclinations of the corresponding sides of successive blades of the cutter decrease progressively from the entering blade 164 to the last blade 160. The corresponding side surfaces of these blades are preferably relieved back of their side-cutting edges like the blades of the cutter of Fig. 23 hereinafter described.

A cutter made according to Figs. 21 and 22 may be used in a manner similar to the manner described with reference to the cutter of Figs. 16 to 20 inclusive. Thus the cutter may be fed depthwise into the blank in time with the rotation of the cutter. The blade 164 of greatest point width begins to cut first. As the cutter revolves, it is progressively fed into depth, so that when the cutter axis has moved from position 162' to position 162'', the blade 168 will be cutting while when the cutter axis has moved to the position 162''', the blade 160 will be cutting at full depth position. Then the cutter is withdrawn from engagement with the blank and the blank is indexed. If the cutter is of the gap type, the indexing may be started before withdrawal is completed, for it may be started when the gap in the cutter is abreast of the blank. After indexing, the cutter is fed back into engagement with the blank to cut a new tooth space of the blank. Thus on each revolution of the cutter, one tooth space of the blank 170 may be roughed out.

The curved side edges of the blades of this cutter do very little side cutting but they serve to produce a smoother finish on the roughed tooth sides of the tooth space than will be produced by the blades of the cutter of Figs. 16 to 20 inclusive. In Fig. 21, the cutter is shown as producing tooth profile shapes 171 and 171' on opposite sides of a tooth space of the gear 170 which approach an involute shape, but it will be obvious that any other desired shape may be produced by suitable selection of the point-widths of successive blades, the profile curvature of the blades, and the inclination of these profiles to the plane of rotation of the cutter. Like the cutter of Figs. 16 to 20 inclusive, the cutter of Figs. 21 and 22 has blades of uniform height, but usually of a height less than the depth of the tooth spaces to be cut.

Figure 23:
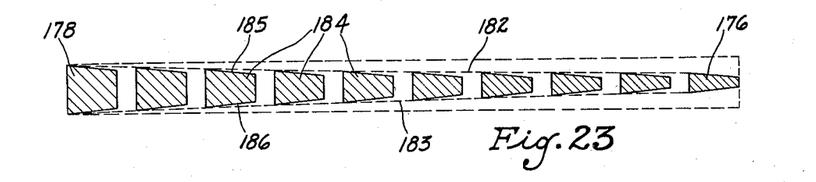
Fig. 23 is a developed sectional view of this last form of cutter.
Figures 24, 25, 26, 27, 28:
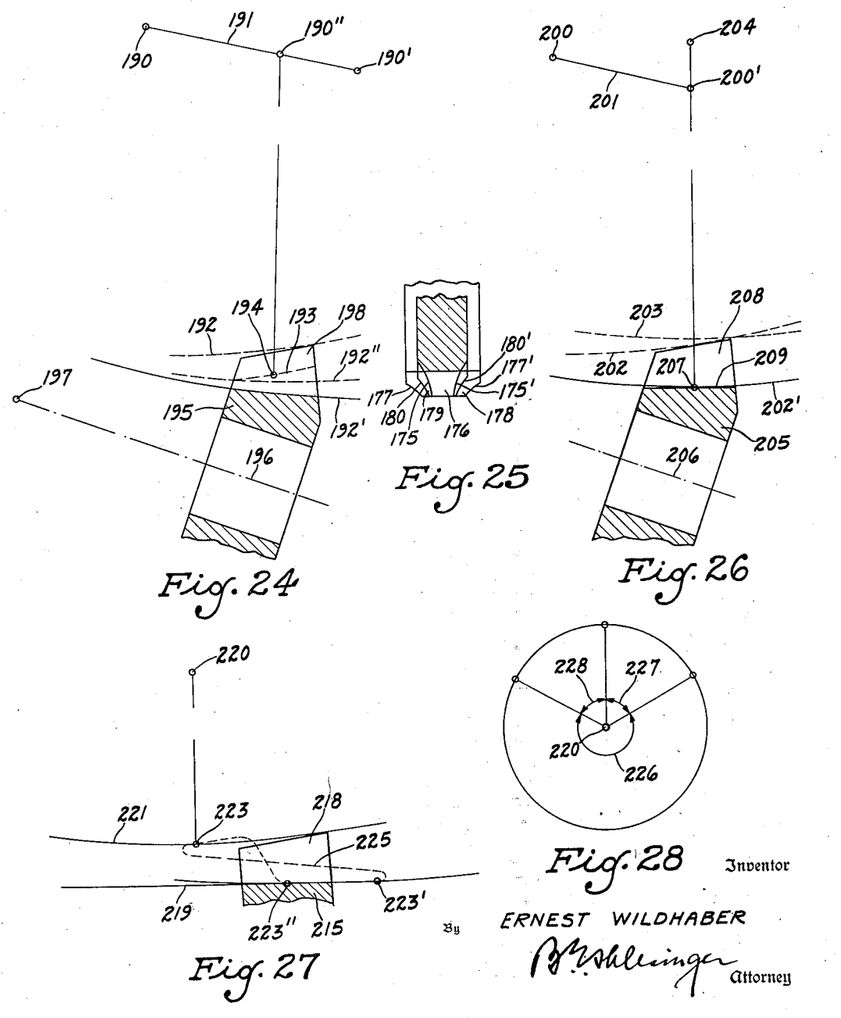
Fig. 24 is a diagrammatic view, illustrating a method of cutting bevel gears according to this invention in which the cutter has a feed in one direction lengthwise of a tooth space.
Fig. 25 is a diagrammatic view, showing, superimposed on one another, several blades of a modified form of cutter constructed according to this invention which is adapted to be used in the method illustrated in Fig. 24.
Fig. 26 is a diagrammatic view, illustrating a further modified method of cutting bevel gears according to this invention with a lengthwise feed of the cutter in one direction.
Fig. 27 is a diagrammatic view showing one way of cutting the tooth surfaces of a bevel gear according to this invention where the cutter is fed first in one direction and then in the opposite direction longitudinally of a tooth space.
Fig. 28 is a diagrammatic view, showing the angles through which the cutter rotates during the different parts of the cycle of cutting a tooth space by the process disclosed in Fig. 27.

Figs. 23 and 25 show a cutter similar to that of Fig. 22 but made for use in cutting bevel gears. This cutter, like the cutter of Fig. 22, has blades of uniform height, but usually of less height than the tooth spaces of the gear to be cut. Its sides, like the sides of the blades of the cutter of Fig. 22, are of curved profile, preferably of circular arcuate profile curvature. Its blades, like the blades of Fig. 22, are of varying point-width around the cutter periphery, and, like the cutter of Fig. 22, the tip-cutting edges of this cutter lie in a cylindrical surface concentric to the axis 162 of the cutter. The sides 175 and 175' of the blade 176, which is of least point-width, are least inclined to a plane of rotation of the cutter, while the sides 177 and 177' of the blade 178, which is of greatest point-width, are most inclined to the axis of the cutter. The blade 179 intermediate the blades 176 and 178 has opposite side surfaces 180 and 180' whose inclination to the plane of rotation is intermediate the inclinations of the sides of the blades 176 and 178.

This cutter has its opposite side-cutting edges lying in surfaces 182 and 183, respectively, and the side surfaces of the individual blades of this cutter are relieved with reference to these continuous surfaces 182 and 183, as clearly shown in Fig. 23. In this figure, the blades are denoted generally at 184 and their opposite side surfaces at 185 and 186, respectively.

The cutter of Figs. 23 and 25 may be used in many different ways for cutting bevel gears. In the instance illustrated in Fig. 24, the tooth spaces of the gear blank 195 are cut by rotating the cutter on its axis and simultaneously imparting a straight line feed motion to the cutter longitudinally of the tooth space in time with the cutter rotation and in a direction which is inclined to the root surface of the tooth space being cut with the result that the cutter has a combined lengthwise and depthwise feed movement as it moves from one end of the tooth space to the other. Thus in Fig. 24, the cutter starts to cut with its axis in a position 190 and is fed in a direction such that the axis of the cutter moves along the straight line 191. 190' denotes the position of the axis of the cutter at the end of the feed movement and 190'' denotes the position of the cutter axis at an intermediate point in the feed. 192, 192', and 192'' denote, respectively, the positions of the cutter periphery for the different positions 190, 190', and 190'' of the cutter axis. 192' is also the root line of the tooth space being cut, while 196 denotes the axis of the blank and 197 its apex.

The feed motion in the instance disclosed may be performed at a constant rate or at a varying rate. The rate at which the cutter is to be fed is, of course, reflected in the structure of the cutter.

At the end of the feed movement, a tooth space of the blank will be completed, and the cutter may then be returned rapidly to starting position. The cutter may be made of the gap-type and the blank indexed during the return movement when the gap in the cutter is abreast of the blank.

The process described with reference to Fig. 24 can well be used for finish-cutting providing that the cutter diameter is comparatively large so that the lines of contact between the cutting surface and the tooth surface to be produced extend sufficiently lengthwise of the tooth space. In the instance illustrated, this condition prevails. Here the line 193 is a line of contact when the cutter is cutting at a mean point 194 along the length of the tooth space and the axis of the cutter is at 190'' and its periphery at 192''. The line of contact 193 extends over only a portion of the height of the tooth surface 198 being cut, and each blade of the cutter contacts with the finished tooth surface 198 over only a portion of the height of this surface. This is why this cutter can be employed in the cutting of bevel gears.

Each blade is required to finish-cut only a part of the tooth height and each blade therefore may be made of less than the full tooth height.

Fig. 26 illustrates a modification of this invention as applied to the rough-cutting of a bevel gear which is to be finish-cut by some other method. Here a single direction of feed is also used and here again, also, the direction 201 of the feed is inclined at an acute angle to the root line 209 of the tooth space to be cut. The blank is here denoted at 205, its axis at 206, and one side of a tooth of the blank at 208. In the feed movement, the cutter axis moves from a starting position 200 to an end position 200'. At the start of the cut, the cutter periphery is at 202 and at the finish of the cut the periphery of the cutter is at 202', tangent to the root line 209 of the tooth space being cut at a point 207 midway the ends of the tooth space.

The inclined direction of feed is preferred over a straight depthwise feed in the cutting of bevel gears for two reasons, namely, improved cutting action and closer approximation of the bevel tooth shape. The improved cutting action is due to the smaller chip-thickness at the start of each cut when the cutter is so fed as to start cutting at the small end of the tooth space. The improved cutting action will be apparent when the position of the periphery of the cutter 202 at the start of a cut in the process of the present invention is compared with the position 203 which the periphery of the cutter would occupy were a pure depthwise feed to be imparted to the cutter and were the initial position of the cutter axis to be at 204. It will be seen that the initial cuts taken, where depthwise feed only is employed, are shorter and less efficient than the cuts taken initially by a cutter operating according to the process of this invention. The tooth shape is improved because the upper portion of the desired bevel tooth surface will be cut only while the cutter is displaced toward the apex of the blank, that is, while the cutter is taking its initial cuts. Hence the upper portions of the tooth profile in the method of Fig. 26 are cut with blades of point-width and profile shape suited to produce the desired width and shape of the upper portions of the tooth spaces of the blank.

With the embodiment illustrated in Fig. 24, however, it is possible to closely approximate the desired bevel tooth curvature for the whole of the height and length of the tooth surface, but with the process of Fig. 24 the space has more than natural taper in depth from end to end. In other words, the tangent to the produced root line 192' does not pass through the gear apex 197. The amount of variation from actual tooth taper is not great, however, and is of the character which has heretofore been generally accepted on small spiral bevel gears.

Now while the processes of cutting bevel gears illustrated in Figs. 24 and 26 have the advantage of simplicity in that a single straight line feed movement is employed, nevertheless greater flexibility in tooth design may be obtained where both lengthwise and depthwise feed movements are employed as is the case in the machine of my prior application No. 401,631 above mentioned. Here the cutter has a cam-controlled feed movement depthwise of the tooth space being cut in addition to a harmonic feed movement lengthwise of the tooth space.

Figs. 27 and 28 illustrate one way in which a cutter constructed according to this invention may be employed in the production of tooth spaces of a bevel gear in a double-feed cycle. Here 215 denotes the bevel gear to be cut. 218 is a side of a tooth space of this gear, and 219 the root line of the tooth space. The cutter employed may be of the type already described with reference to Figs. 23 and 25. The cut starts with the cutter axis in the position 220 with the cutter periphery at 221 and with the point 223 in the cutter periphery extending in the direction of the root line 219.

In cutting a tooth space of the gear 215, the cutter performs a harmonic motion lengthwise of the tooth space and in a direction inclined at an acute angle to the root line 219 so that the point 223 travels along a line 225. It reaches full depth after the direction of the lengthwise feed movement has been reversed, and when the point 223 coincides with point 223'. Then the depth feed ceases but the cutter continues to be fed in its return movement lengthwise of the tooth space along the root line 219 until the point 223 reaches the point 223''. Thus the bottom of the tooth space is straightened out. Then the cutter is withdrawn from engagement with the blank and returned to starting position at 223 with its axis at 220. During the withdrawal, the blank is indexed, and, the cycle begins anew to cut a new tooth space of the blank. A gap in the cutter permits of starting indexing while the withdrawal motion is taking place.

During the feed movement of the cutter from the position 223 to the position 223', the cutter rotates on its axis through an angle denoted at 226 in Fig. 28. In the return feed movement to point 223'' the cutter rotates still further on in the same direction through an angle 227. During withdrawal and indexing, the cutter will continue to rotate on in the same direction through the angle denoted at 228. The depth-roughing blades of the cutter occupy a portion of its periphery corresponding to the angle 226. Further blades occupy a portion of periphery corresponding to the angle 227 and straighten out the tooth bottom. A gap in the cutter is provided corresponding to the angle 228.

Figure 29:
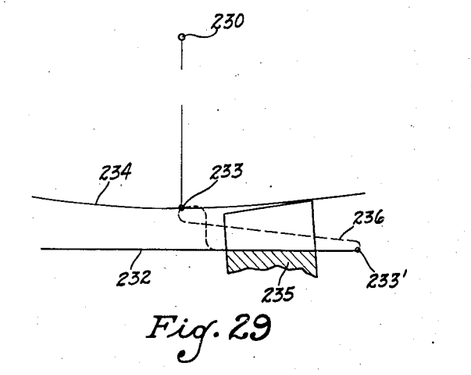
Fig. 29 is a diagrammatic view showing a still further method of cutting bevel gears according to this invention in which a tooth space is roughed by movement of the cutter longitudinally of the tooth space in one direction and finished on the return feed movement of the cutter.
Figure 30:
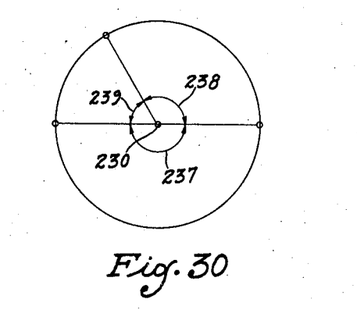
Fig. 30 is a diagrammatic view, showing the angles through which the cutter rotates during the different parts of the cycle of cutting a tooth space according to the method shown in Fig. 29.

Another cycle of operation, which may be employed in cutting gears according to the present invention on the machine of my earlier application No. 401,631, is illustrated in Figs. 29 and 30. Here the cut starts with the cutter axis in position 230 and with the point 233 of the periphery 234 of the cutter extending in a direction parallel to the root line 232 of a tooth space to be cut in the bevel gear 235. Again the forward feed movement is along a line 236 inclined at an acute angle to the root line 232 of the tooth space. When the cutter has cut for the full length of the tooth space, it will have reached full depth at point 233'. Then the cutter is fed the full distance back through the tooth space so that the sides of the tooth space are completely swept over again by the cutter, and in this backward movement, the cutter continues to cut at full depth. When the cutter has completed the return cut on the tooth space, the cutter is withdrawn from engagement with the blank and moved back to initial position at 233. During this withdrawal movement, the blank may be indexed. Then the cut begins anew on a new tooth space of the blank.

In the forward cutting stroke, the cutter will rotate on its axis through an angle 237 (Fig. 30). In the return cutting stroke, the cutter will rotate further on through an angle 238. Indexing will take place while the cutter is rotating still further on through an angle 239 and while the gap in the cutter is abreast of the blank.

The depth-roughing blades of a cutter, operating according to the process described in Figs. 29 and 30, are designed to leave a slight amount of stock on the sides of the tooth space for removal by the blades which operate at full depth. A cutter for performing the process illustrated in Figs. 29 and 30 will be made according to the principles previously described. The inclination of the side-cutting edges of the blades and their point-width will vary in accordance with the points at which they are to cut. The depth-roughing blades of the cutter could be made of less height than the tooth space, but the finishing blades have to be made with side-cutting edges of a height at least equal to the tooth depth in order to sweep the tooth sides completely in the return stroke at full depth. For this reason ordinarily the roughing blades are made of the same height as the finishing blades. The tip-cutting edges of both roughing and finishing blades will be made concentric of the axis of the cutter as in the previously described forms of this invention.

The process illustrated in Fig. 29 is based upon the use of a machine such as disclosed in my earlier application No. 401,631 where the lengthwise feed movement is a harmonic motion, but it will be obvious that the lengthwise feed movement may be effected at a uniform rate or be any other suitable motion. It will further be understood that while the process disclosed in Fig. 29 is particularly applicable to the cutting of bevel gears, it may also be applied to the cutting of spur gears including the finishing of such gears. In the cutting of spur gears, it will be obvious that the finishing blades will be all of the same profile shape although the point-width of the blades may vary if a localized tooth bearing is to be produced. The point-width of the roughing blades will vary in accordance with the principles generally set-forth with regard to Figs. 17 to 22.

Figure 31:
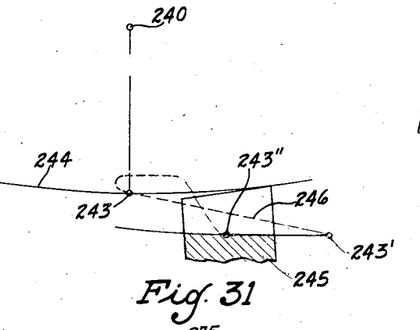
Fig. 31 is a diagrammatic view, illustrating a further modified process of cutting bevel gears according to this invention.

Fig. 31 illustrates another possible cycle of operation with this invention. This cycle of operation is similar to that disclosed with reference to Fig. 27. Here the cut starts with the cutter axis at 240 and the cutter periphery at 244 with the tangent at the point 243 of that periphery exending in the direction of the root line of a tooth space of the gear 245 to be cut. The cutter is fed, preferably at a constant rate along a straight line 246, which is inclined at an acute angle to the root line of the tooth space, to full depth position where the periphery of the cutter contacts with the root line of the tooth space in the point 243'. Then the feed movement is reversed, and accelerated, and directed along the tooth bottom to point 243'', where cutting ceases. The cutter is then withdrawn from engagement with the blank and returned to initial position 243 while the blank is indexed. The return feed movement from position 243' to position 243'' serves chiefly to straighten out the tooth bottom and the whole of the tooth surface is not swept over a second time.

The cycle of operation illustrated in Fig. 31, like the cycles disclosed in Figs. 17 to 28 inclusive, permits of using cutters that have blades of less height than the depth of the two spaces to be cut. Cutters may be employed such as shown in Figs. 23 and 25 which have blades of varying point-width and in which the inclination of the side-cutting edges to a plane of rotation of the cutter increases with increasing point-width. It is also possible, however, to use a cutter of the type illustrated in Figs. 16 to 20 inclusive if the operation is a rough cutting operation only. Even with the last-mentioned type of cutter, it is possible to rough tooth spaces on bevel gears very closely approaching the desired finished tooth shape. Only a little extra stock is left at the two ends of the teeth.

Figures 32, 34, 35, 36:
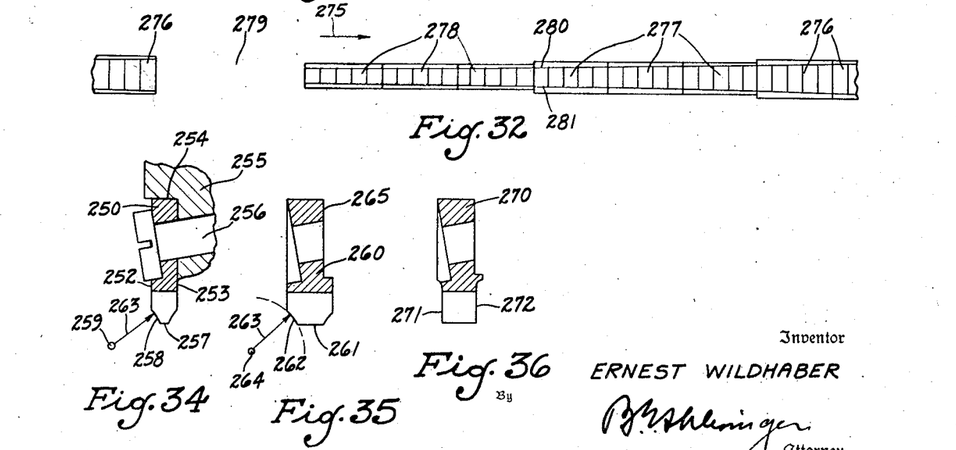
Fig. 32 is a developed view of a cutter made according to this invention and showing how the cutter may be made from different stock-size segments.
Figs. 34 and 35 are radial sectional views of different segments of this cutter.
Fig. 36 is a radial sectional view of a segment of modified form.
Figure 33:
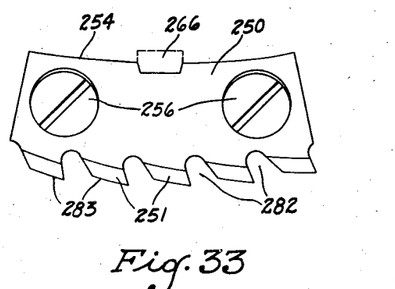
Fig. 33 is a side elevation of one of the segments.

The cutters referred to in connection with Figs. 16 to 31 inclusive are preferably made of the segmental type with a plurality of cutting blades integral with each segment. A typical segment is shown in Figs. 33 and 34 at 250. This segment has five integral cutting blades or teeth 251. The segment has plane sides 252 and 253 and a cylindrical inside seating surface 254. The inside surface 254 and the side surface 253 seat against corresponding surfaces of the cutter head 255 and the segment is secured to the cutter head by screws 256 which pass through inclined holes formed in the segment and thread into the cutter head. A key 266 serves to locate the segment angularly on the cutter head.

A cutter may be made up of several groups of segments whose body portions are of different standard thicknesses. Thus the cutter may comprise segments 250 and 260 (Figs. 34 and 35). The plane side 265 of the segment 260, however, is at the same distance from the median center line of the cutting portion of this segment 260 as the side 253 of the segment 250 is from the center line of the cutting portion of that segment. Thus the side surface of a cutter head against which the sides 253 and 265 of the segments seat may be made a single continuous plane.

The individual blades of the segments are made according to the principles hereinbefore set forth. They have their tip-cutting edges arranged at a constant radial distance from the axis of the cutter and are of successively varying point-width. Moreover, if the side profiles of the blades are curved they have preferably uniform curvature, but for a bevel gear cutter, corresponding side edges of different blades are differently inclined to a plane of rotation of the cutter. Thus, the blade of segment 260, which is shown in section in Fig. 35, has a wider top cutting edge 261 than the top cutting edge 257 of the blade of segment 253 shown in Fig. 34. The side-cutting profile 262 of the blade of segment 260 has the same radius of curvature 263 as the corresponding side-cutting edge 258 of the blade of segment 253. The center 264 of the profile 262 is displaced, however, with reference to the center 259 of the profile 258.

Figure 20:
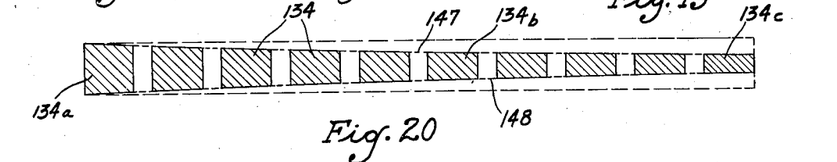
Fig. 20 is a developed sectional view of this cutter.

In Fig. 36 I have shown a segment 270 for a cutter of the type illustrated in Figs. 19 and 20. Here the opposite sides 271 and 272 of the cutting portions of each blade are of zero pressure angle.

Fig. 32 shows a developed view of a segmental cutter made according to this invention. This cutter is intended to rotate in the direction of the arrow 275. The cutter shown has three segments 276 of relatively large thickness, three segments 277 of medium thickness, and three segments 278 of relatively small thickness. The thickest segments 276 come first, in the direction of rotation of the cutter. Between the last segment 278 and the first segment 276 there is a peripheral gap 279. To illustrate the change in point-width of the cutting portions of the several segments, lines 280 and 281 have been drawn. These lines contain the points of intersection of the side edges and tip edges of the cutting teeth of the segments. It will be seen that these lines converge from the first to the last segment of the cutter. In the embodiment shown these lines 280 and 281 are slightly concave in development.

When segments such as have been described are employed, a minimum of high speed steel is required in a cutter and the segments can be made accurately at low cost. The gashes 282 between successive blades or teeth of the segments and the relieved top surfaces 283 of the blades or teeth of the segments can be milled simultaneously either by feeding a milling cutter across the width of the segment from side to side or by feeding it depthwise into the segment. The last named operation is much faster and a larger milling cutter can be used for the purpose.

Segments of various cutters require no differentiation in the soft state. Where the blades are to have curved sides, the cutting portions of the segments may be made up initially before hardening with chamfered sides. The initial chamfer may be based only on the segment thickness, different sized segments being differently chamfered. The segments may be hardened, ground on their plane sides and on the cylindrical inside surface, on the key way and on their relieved top portions. They may then be put in stock. When an order is received for a particular cutter, the sides of the cutting portions of the segments are the only parts which are required to be ground. Hence a cutter can be produced on very short notice. The grinding of the sides may be performed on a relieving grinder of the character described in my earlier Patent No. 2,221,827. Segments of the type disclosed in Fig. 36 are contemplated especially for use in cutting gears of finer pitches and, of course, are left unchamfered.

While several different embodiments of the invention have been described, it will be understood that the invention is capable of still further modification. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A rotary gear cutter of the disc type, having blades arranged on the greater part of its circumference, the tip cutting edges of which have varying widths and lie in a cylinder whose axis coincides with the cutter axis, and the corresponding side cutting edges of successive blades having varying inclination to the tip cutting edges and being of circular arcuate profile shape and of uniform radius of curvature, the centers of curvature of the corresponding side cutting edges of successive blades being progressively displaced axially of the cutter.

2. A rotary gear cutter of the disc type having a plurality of circumferentially arranged cutting blades whose tip-cutting edges are arranged at a uniform radial distance from the axis of the cutter but are of varying point-width, diametrically opposite blades having tip-cutting edges of maximum and minimum point-width, respectively.

3. A rotary gear cutter of the disc type having blades arranged on the greater part of its circumference which have tip and side-cutting edges, the tip-cutting edges of successive blades being of successively varying point-width and the corresponding side-cutting edges of successive blades being of identical profile shape but being inclined at different obtuse angles to the tip cutting edges of the blades, the inclination of corresponding side-cutting edges to the tip cutting edges increasing with decreasing point-width.

4. A rotary gear cutter of the disc type having a plurality of circumferentially arranged blades which have tip and side-cutting edges, the tip-cutting edges of successive blades being of successively varying point-width, and the corresponding side-cutting edges of successive blades being differently inclined to a plane of rotation perpendicular to the axis of the cutter, the inclination of corresponding side-cutting edges to said plane increasing with decreasing point-width, and diametrically opposite blades having tip-cutting edges of maximum and minimum point-width, respectively.

5. A rotary gear cutter of the disc type having a plurality of circumferentially arranged blades whose tip-cutting edges are parallel to the axis of the cutter and of successively varying point-width and are arranged at a uniform radial distance from said axis, and whose opposite side profiles are perpendicular to the tip-cutting edges, said blades being of uniform height and being of less height than the height of the tooth spaces of the gear to be cut.

6. A rotary gear cutter of the disc type having a plurality of circumferentially arranged blades whose opposite sides are of circular arcuate profile curvature and whose tip-cutting edges are of successively varying point-width and are arranged at a uniform radial distance from the axis of the cutter, corresponding side-cutting edges of successive blades having the same radius of curvature but varying inclination to a plane of rotation perpendicular to the axis of the cutter.

7. A rotary gear cutter of the disc type having a plurality of circumferentially arranged blades whose opposite sides are of circular arcuate profile curvature and whose tip-cutting edges are of successively varying point-width and are arranged at a uniform radial distance from the cutter axis, corresponding side-cutting edges of different blades having the same radius of curvature but varying inclination to a plane of rotation perpendicular to the axis of the cutter, the inclination of corresponding side-cutting edges of successive blades increasing with decreasing point-width of the blades.

8. A rotary gear cutter of the disc type having a plurality of circumferentially arranged blades whose opposite sides are of circular arcuate profile curvature and whose tip-cutting edges are of successively varying point-width and are arranged at a uniform radial distance from the cutter axis, corresponding side-cutting edges of different blades having the same radius of curvature but varying inclination to a plane of rotation perpendicular to the axis of the cutter, the inclination of corresponding side-cutting edges of successive blades decreasing with decreasing point-width of the blades.

9. A rotary gear cutter of the disc type having a plurality of circumferentially arranged blades whose corresponding side-cutting edges are such as might be formed by displacing a circular arc of a given radius of curvature in a direction inclined to a plane of rotation perpendicular to the axis of the cutter and in a harmonic manner and whose tip-cutting edges are arranged at a constant distance from the axis of the cutter but vary in point-width around the cutter in a harmonic manner.

10. A rotary gear cutter of the disc type having a plurality of circumferentially arranged blades whose tip-cutting edges are of successively varying point-width and are arranged at a constant radial distance from the axis of the cutter, corresponding side surfaces of said blades lying in a continuous helical surface of varying lead.

11. A rotary gear cutter of the disc type, having blades arranged on the greater part of its circumference and having a gap between the last and first blades, the tip-cutting edges of said blades being arranged at a constant distance from the cutter axis and decreasing in point-width from the first to the last blade.

12. A rotary gear cutter of the disc type, having blades arranged on the greater part of its circumference and having a gap between the last and first blades, the tip-cutting edges of said blades being arranged at a constant distance from the cutter axis and decreasing in point-width from the first to the last blade, the side edges of said blades being straight and having a constant inclination to the cutter axis.

13. A rotary gear cutter of the disc type having blades arranged on the greater part of its circumference and having a gap between the last and first blade, the tip-cutting edges of said blades being arranged at a constant distance from the cutter axis and decreasing in point-width from the first to the last blade, the side edges of said blades being substantially circular arcs and forming obtuse angles with the tip-cutting edges.

14. A rotary gear cutter of the disc type having a plurality of circumferentially arranged blades which have side and tip cutting edges and which are of uniform height but of less height that the height of the tooth spaces to be cut, the tip cutting edges being arranged at a constant distance from the cutter axis but being of progressively varying point width, and the corresponding side cutting edges of different blades being of identical profile shape but differently inclined to their tip cutting edges.

15. A rotary gear cutter of the disc type having a plurality of circumferentially arranged blades which have side and tip cutting edges which are of uniform height but of less height than the height of the tooth spaces to be cut, the tip cutting edges being arranged at a constant distance from the cutter axis but being of progressively varying point width, and corresponding side cutting edges of different blades being of identical circular arcuate profile shape but having their centers of curvature displaced axially and radially from one another.

16. A rotary gear cutter of the disc type having a plurality of circumferentially arranged blades which have tip and side cutting edges, the tip cutting edges of successive blades being arranged at a constant distance from the cutter axis but being of progressively varying point width and the corresponding side cutting edges of successive blades being of identical circular arcuate profile shape but having their centers of curvature displaced axially and radially from one another and diametrically opposite blades having tip cutting edges of maximum and minimum point width, respectively.

17. A rotary gear cutter of the disc type having blades arranged on the greater part of its circumference which have side and tip cutting edges, the tip cutting edges of said blades being arranged at a constant distance from the cutter axis and being of progressively decreasing point width, the side-cutting edges of said blades being straight and having a constant inclination to the cutter axis, corresponding sides of successive blades lying in a common helical surface of varying lead.

18. A rotary cutter of the disc type for cutting tapered gears, having a plurality of equi-spaced cutting blades arranged around its periphery which have side and tip cutting edges, the tip cutting edges of said blades being arranged at a constant distance from the axis of the cutter, and successive blades having progressively varying profile shapes, the variation being reversed at diametrically opposite points.

19. A rotary cutter of the disc type for cutting tapered gears, having a plurality of equi-spaced cutting blades arranged around its periphery which have side and tip cutting edges, the tip cutting edges of said blades being arranged at a constant distance from the axis of the cutter, and corresponding side cutting edges of successive blades being of identical circular arcuate shape but having their centers of curvature displaced from one another axially and radially of the cutter, the displacement being reversed at diametrically opposite points.

20. A rotary gear cutter of the disc type having blades arranged on the greater part of its circumference and having a gap between the last and first blades, the tip-cutting edges of said blades being arranged at a constant distance from the cutter axis and decreasing in point width from the first to the last blade, and the side edges of said blades being substantially circular arcs and forming obtuse angles with the tip-cutting edges of the blades, corresponding side-cutting edges of the blades being of identical profile curvature but differently inclined to a plane of rotation perpendicular to the aixs of the cutter.

21. A rotary gear cutter of the disc type having a plurality of cutting blades arranged around its periphery which have side and tip-cutting edges, the tip-cutting edges of the blades being arranged at a constant distance from the axis of the cutter and increasing progressively in point-width from the first blade to a blade approximately half way around the periphery of the cutter and then decreasing in point-width again, and corresponding side-cutting edges of the blades being of identical circular arcuate profile shape but having progressively decreasing inclination to a plane perpendicular to the axis of the cutter from said first blade to the said blade approximately half way around the periphery of the cutter, and then having progressively increasing inclination to said plane.

ERNEST WILDHABER.